US009367513B2

(12) United States Patent
Takeda

(10) Patent No.: US 9,367,513 B2
(45) Date of Patent: Jun. 14, 2016

(54) IMAGE DISPLAY DEVICE

(75) Inventor: Masanobu Takeda, Shimada (JP)

(73) Assignee: Yazaki Corporation, Tokyo (JP)

( * ) Notice: Subject to any disclaimer, the term of this patent is extended or adjusted under 35 U.S.C. 154(b) by 276 days.

(21) Appl. No.: 13/703,960

(22) PCT Filed: May 17, 2011

(86) PCT No.: PCT/JP2011/061276
§ 371 (c)(1), (2), (4) Date: Dec. 13, 2012

(87) PCT Pub. No.: WO2011/158587
PCT Pub. Date: Dec. 22, 2011

(65) Prior Publication Data

US 2013/0083041 A1 Apr. 4, 2013

(30) Foreign Application Priority Data

Jun. 16, 2010 (JP) ................................ 2010-137042

(51) Int. Cl.
*G06F 15/16* (2006.01)
*G09G 5/00* (2006.01)
(Continued)

(52) U.S. Cl.
CPC ................ *G06F 15/16* (2013.01); *B60K 35/00* (2013.01); *B60K 37/02* (2013.01); *G09G 5/00* (2013.01); *G09G 5/003* (2013.01);
(Continued)

(58) Field of Classification Search
CPC .............. G06F 15/16; B60K 2350/352; B60K 2350/1064; B60K 35/00; B60K 37/02; B60K 2350/1072; G09G 5/00; G09G 5/363; G09G 2380/10; G09G 5/003
USPC .................. 340/438, 461, 462; 345/520–531
See application file for complete search history.

(56) References Cited

U.S. PATENT DOCUMENTS

2002/0040261 A1* 4/2002 Nakamoto .......... G06F 11/0757 701/1
2006/0179255 A1* 8/2006 Yamazaki ............ G06F 15/167 711/147

(Continued)

FOREIGN PATENT DOCUMENTS

DE 10233117 A1 2/2004
EP 1439455 A1 7/2004

(Continued)

OTHER PUBLICATIONS

The CAN-bus Wiki project http://www.can-wiki.info/doku.php.*

(Continued)

*Primary Examiner* — Ming Hon
*Assistant Examiner* — Phuc Doan
(74) *Attorney, Agent, or Firm* — Locke Lord LLP; James E. Armstrong, IV; Brian S. Matross

(57) ABSTRACT

To provide an image display device to simplify software for rewriting data, and shorten rewrite time, a vehicle meter 1 includes the image display device including: a display device 10 displaying the image data; a main microprocessor 30 including Flash-ROMa 31 and I/F 32 communicating with external; and GDC microprocessor 40 including Flash-ROMb 41 the image data is stored, controlled by the main microprocessor 30, and controlling the display device 10, whereby the GDC microprocessor 40 includes an I/F 42 for directly rewriting the image data from external.

2 Claims, 4 Drawing Sheets

(51) Int. Cl.
*B60K 35/00* (2006.01)
*B60K 37/02* (2006.01)
*G09G 5/36* (2006.01)

(52) U.S. Cl.
CPC .................. *B60K 2350/1064* (2013.01); *B60K 2350/1072* (2013.01); *B60K 2350/352* (2013.01); *G09G 5/363* (2013.01); *G09G 2380/10* (2013.01)

(56) References Cited

U.S. PATENT DOCUMENTS

| | | | | |
|---|---|---|---|---|
| 2006/0221997 | A1* | 10/2006 | Gonzalez et al. | 370/463 |
| 2006/0270348 | A1* | 11/2006 | Ibrahim et al. | 455/41.2 |
| 2007/0033349 | A1* | 2/2007 | Myers et al. | 711/154 |
| 2007/0171142 | A1* | 7/2007 | Ikarashi | B60K 35/00 345/4 |
| 2008/0309474 | A1* | 12/2008 | Okamoto et al. | 340/462 |
| 2008/0309475 | A1* | 12/2008 | Kuno | B60K 35/00 340/462 |
| 2009/0179745 | A1 | 7/2009 | Okamoto et al. | |
| 2010/0023255 | A1* | 1/2010 | Nambata | G01C 21/3635 701/533 |
| 2010/0283597 | A1* | 11/2010 | Yoda et al. | 340/461 |

FOREIGN PATENT DOCUMENTS

| | | | |
|---|---|---|---|
| JP | 2006-335080 | A | 12/2006 |
| JP | 2008-239145 | A | 10/2008 |
| JP | 2009-006950 | A | 1/2009 |
| WO | WO-2009/093371 | A1 | 7/2009 |

OTHER PUBLICATIONS

The CAN-bus Wiki project , http://www.can-wiki.info/doku.php.*

International Search Report dated Aug. 23, 2011, issued for PCT/JP2011/061276.

Supplementary European Search Report dated Dec. 5, 2013, issued for the European patent application No. 11795495.8.

* cited by examiner 1
10
DISPLAY
40
41
42
Flash-ROMb
GDC
MICRO-
PROCESSOR
I/F
30
31
Flash-ROMa
MAIN
MICROPROCESSOR
32
I/F
2,3,4,5
33
34
EXTERNAL COMMUNICATION-A
(CAN COMMUNICATION)
EXTERNAL COMMUNICATION-B
(CAN COMMUNICATION,USB COMMUNICATION)

IMAGE DISPLAY DEVICE

TECHNICAL FIELD

This invention relates to an image display device displaying an image on the display device, in particular to an image display device displaying such measured value on a display device in an instrument installed in a mobile body such as a vehicle or a ship.

BACKGROUND ART

The mobile body such the vehicle or the ship has instrument device displaying a variety of information metered by various metering devices. For example, the PTL 1 discloses that design of such instrument plate of the metering devices installed in the vehicle is made alterable in these metering devices.

The conventional instrument disclosed in the PTL is provided with a main microprocessor for controlling whole instrument, and a GDC (Graphic Display Control) microprocessor for controlling display device as a sub microprocessor.

The main microprocessor is provided with an interface capable of communicating with external, and a non-volatile rewritable memory such as flash memory, and controls motion of an indicator and the like, or instructs the GDC microprocessor based on control program stored in the memory in order to display a variety of vehicle information inputted from the interface.

The GDC microprocessor is provided with a non-volatile rewritable memory in which image data to be displayed on the display devise is stored, and reads the image data from the memory to display based on instructions from the main microprocessor.

CITATION LIST

Patent Literature

[PTL 1]
Japanese Patent Application Laid-Open Publication No. 2006-335,080

SUMMARY OF INVENTION

Technical Problem

Disadvantageously, in the aforementioned instrument device, when rewriting control program or image data stored in the memory in the main microprocessor or GDC microprocessor, control program data or image data is inputted from external via interface of the main microprocessor to rewrite. Therefore, when rewriting image data stored in the memory of the GDC microprocessor, it was required to rewrite via the main microprocessor, which suffers from complication of software to rewrite because of data being processed via the two microprocessors.

Further, when rewriting the two memories in the main microprocessor and the GDC microprocessor, it was required to process in serial such as rewriting the memory of the main microprocessor followed by rewriting the memory of the GDC microprocessor, which suffers from longer rewrite time.

Such rewriting of image data has been sometimes performed through rewrite of initial data or update, e.g., not only when customizing designs as mentioned above but when manufacturing in a factory or servicing by a dealer, and thereby it would be desirable to shorten the rewrite time.

An object of the present invention is to provide an image display device to simplify software to rewrite data, and shorten rewrite time.

Solution to Problem

To attain the object, an image display device according to a first aspect of the present invention comprises: a display device displaying image data; a main microprocessor including a first interface communicating with external, and a first memory; and a sub microprocessor controlled by the main microprocessor, controlling the display device, and provided with a second memory for storing the image data and, whereby a second interface for directly rewriting the second memory from external.

Preferably, the second interface is configured to communicate at higher speed than the first interface.

Advantageous Effects of Invention

According to the present invention, since the sub microprocessor is provided with the second interface for directly rewriting the second memory from external, it is made possible not only to simplify rewriting program by virtue of rewriting the image data without via the main microprocessor, but to shorten rewrite time by virtue of coinstantaneously rewriting the first memory.

According to the present invention, since the second interface is configured to communicate at higher speed than the first interface, it is made possible further to shorten rewrite time of the image data.

BRIEF DESCRIPTION OF DRAWINGS

For a fuller understanding of the nature and desired objects of the present invention, reference is made to the following detailed description taken in conjunction with the accompanying drawing figures wherein like reference characters denote corresponding parts throughout the several views and wherein.

DESCRIPTION OF EMBODIMENTS

Figure 1:
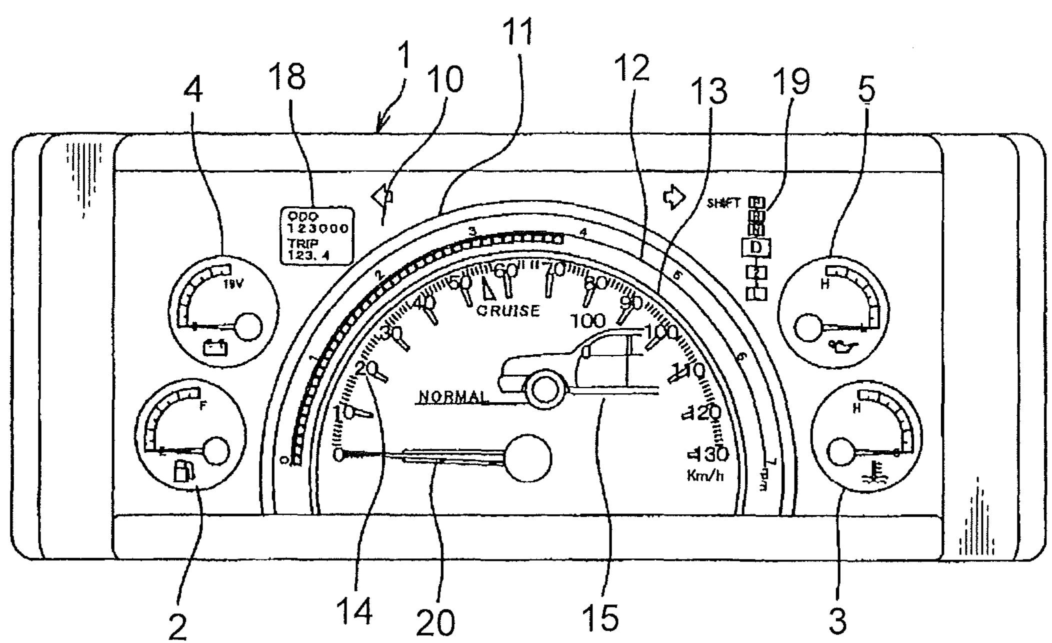
FIG. 1 is an exploded perspective view of a vehicle instrument structure as an image display device according to one embodiment of the present invention.

Referring to FIGS. 1 to 4, one embodiment according to the present invention will be explained. A vehicle instrument 1 as an image display device according to one embodiment of the present invention is shown in FIG. 1, at a middle of which a display device 10 as a display means is arranged. Further about the display device 10 arranged are a fuel meter 2 indicating fuel remaining of such gas, a water temperature meter 3 indicating temperature of coolant water, a battery voltage meter 4 indicating battery voltage, and a oil pressure meter 5 indicating oil pressure of engine oil, each of which is an analog indicator.

The display 10 is composed of such a LCD (liquid crystal display), an EL element, or cathode ray tube. The present embodiment will show the case in which the LCD is employed. On the display 10 an image is displayed including meter design corresponding to such an indicator indicating running state of the vehicle.

A display image of the display 10 includes an outside outline 11, a tachometer indicating area 12 indicating engine rotation speed, a partition line 13, and a speed meter 14 indicating area indicating running speed, as designed to indicate the meter design corresponding to nearly circular indicator plate indicating measured value of running state of the vehicle. Inside the speed meter indicating area 14, a sub indicating area 15 is provided, which indicates other information such as warning indication other than measured value such as the engine rotation speed or the running speed. Between the speed indicating area 14 and the sub indicating area 15, indicator needle 20 composing the analog instrument as well as the meter design which correspond to nearly circular indicator plate.

At a left side of the meter design corresponding to the nearly circular indicator plate, an odd trip meter indicator area 18 is disposed, at right side an automatic shifter indicating area 19.

Further, in the display 10, the indicator needle is typically formed longer to indicate because of absence of such warning indication. The indicator needle 20 is provided with a pivot point that is a down end thereof, a slightly broad middle part extended from the pivot point, and a narrow tip further extended from the middle part to a top end.

Further, indicated in the speed meter indicating area 14 are a bold line scale extending in a radial direction of the meter design corresponding to the nearly circular indicator plate, a fine line scale likewise extending in the radial direction disposed between the bold line scales, a scale character scale indicating the bold line scale. These scales and the indicator needle 20 compose a speed meter that is formed as an analog-typed indicator. I.e., the indicator needle 20 is indicated rotative about the pivot point, and the tip thereof indicates the above-mentioned scale by showing running speed of the vehicle.

In the tachometer indicating area 12, indicated are a scale line composed of the nearly circular outline and a line scale projecting at given interval in the radial direction on the nearly circular outline, and a character scale indicating a scale value of the scale line. Between the scale line and the partition line a segment indicating the engine rotation speed is indicated. The segment is formed nearly square and indicates the number of segments corresponding to the engine rotation speed.

Figure 2:
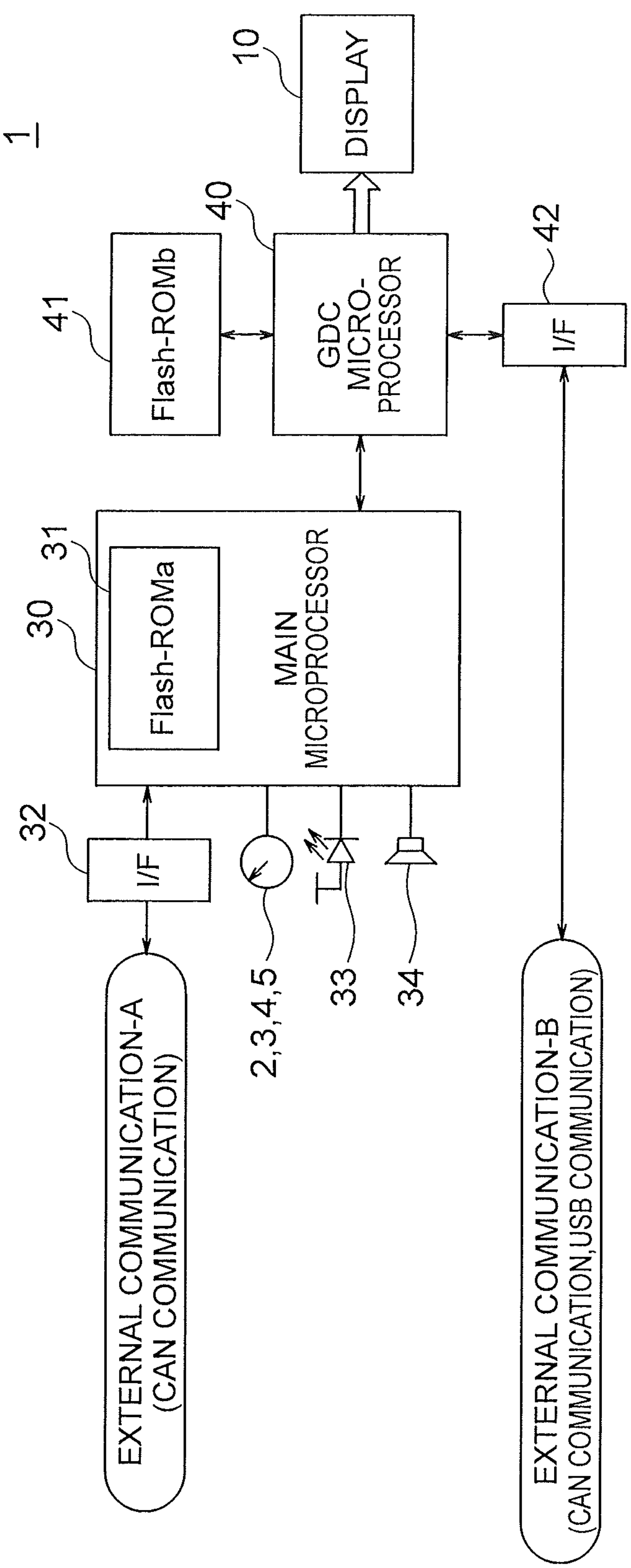
FIG. 2 is a block diagram of the vehicle instrument depicted in FIG. 1.

The vehicle meter 1 as shown in FIG. 2 is provided with a main microprocessor 30, an I/F 32, a meter light 33, a speaker 34, a GDC microprocessor 40, a Flash-ROMb 41, and an I/F 42.

The main microprocessor 30 incorporates Flash-ROMa 31 that is a non-volatile rewritable memory, along with not-shown a CPU and a RAM, controlling whole vehicle meter based on control program stored in the Flash-ROMa 31.

Further, the main microprocessor 30 operates the fuel meter 2, the water temperature 3, the voltage meter 4, and the oil pressure meter 5, respectively, based on a vehicle signal external communication inputted via I/F 32, or controls the meter light 33, the speaker 34, and the GDC microprocessor 40 to be mentioned below.

The I/F 32 as a first interface is a communication interface communicating with external that is compliant with CAN (Controller Area Network), and via which the main microprocessor 30 sometimes communicate with external. Note that the I/F 32 may be incorporated in the main microprocessor 30.

The meter light 33 lightens each meter of the vehicle meters 1. With the display device 10, a back light for the LCD may serve as a meter light. The speaker 34 generates a warning tone or a buzzer tone on the vehicle meter 1 when warning toward passenger.

The GDC microprocessor 40 also incorporates not-shown such a CPU, a RAM, and a ROM, and controls displaying of the display device 10 based on control command from the main microprocessor 30 and control program stored in the ROM. Further, the GDC microprocessor 40 reads image data from the Flash-ROMb 41 to be mentioned below to display the image data on the display device 10.

The Flash-ROMb 41 is a non-volatile rewritable memory, is connected with the GDC microprocessor 40, and stores the image data that is displayed on the display 10. Note that the Flash-ROMb 41 may be incorporated into the GDC microprocessor 40.

The I/F 42 as a second interface is a communication interface communicating with external that is compliant with CAN, and is brought into rewriting the image data of the Flash-ROMb 41. Note that a destination of the I/F 42 is made different from that of the I/F 32. Therefore, the I/F 32 and the I/F 42 can coinstantaneously communicate. Further, the I/F 42 may be incorporated into the GDC microprocessor 40. And the I/F 42 may be compliant with not CAN, but other rules such as USB (Universal Serial Bus).

Then, operation for rewriting the data will be discussed with reference to flow chart of FIG. 3 in the above-mentioned the vehicle meter 1 structure, the data being stored in the Flash-ROMa 31 and Flash-ROMb 41.

Figure 3:
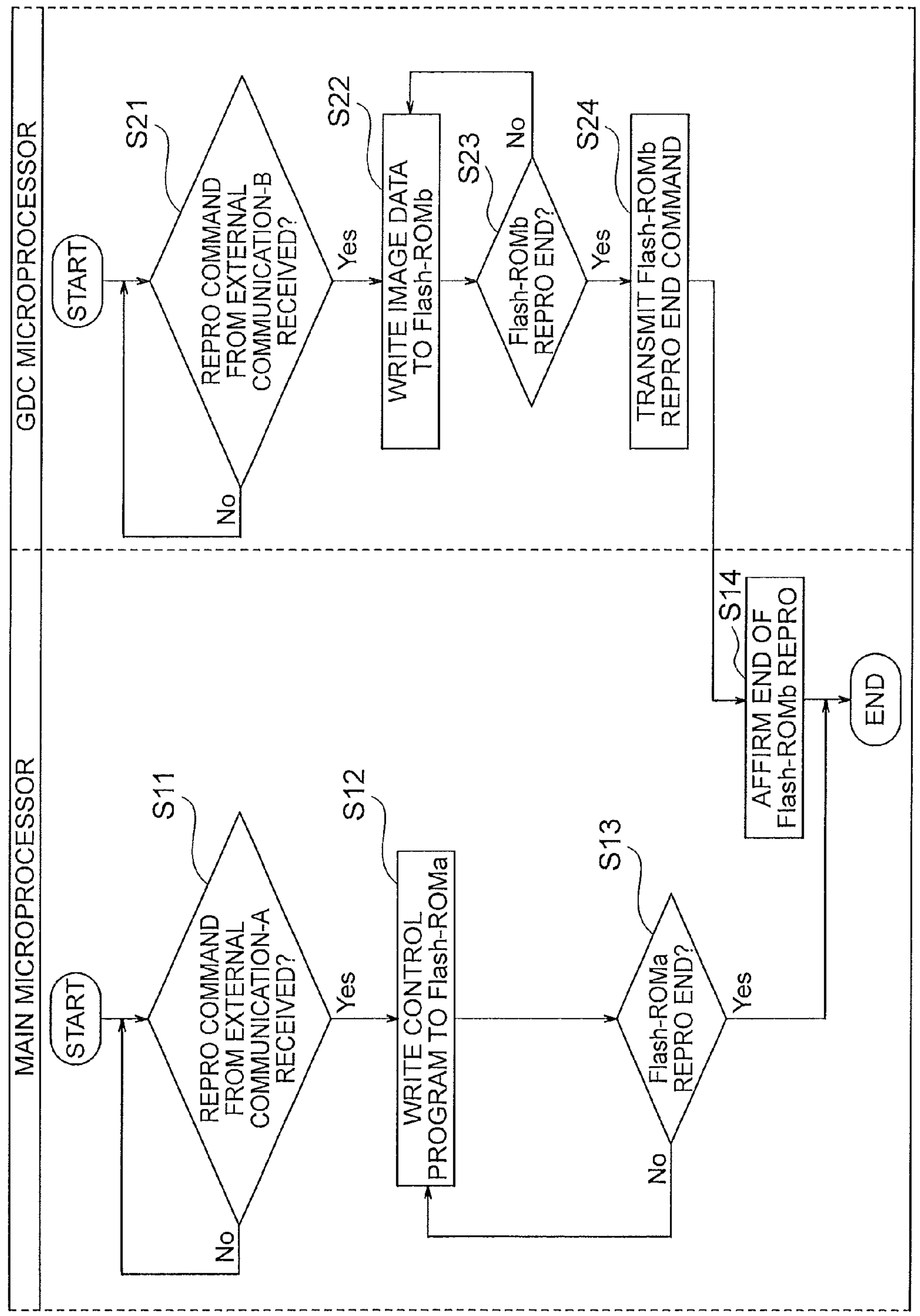
FIG. 3 is a flow chart depicting rewriting of a flash-ROM depicted in FIG. 2.

In the flow chart of FIG. 3, the main microprocessor 30 executes steps S11 to S14, and GDC microprocessor 40 steps S21 to S24. And as shown in FIG. 3, the steps S11 to S13 and the steps S21 to S24 can be designed coinstantaneously executable.

First, the main microprocessor 30 determines whether repro-command (command for rewriting the Flash-ROMa31) is received in the step S11 via external communication, i.e., the I/F 32, then goes to the step S12 if received, otherwise waits in the step.

Then, the main microprocessor 30 in the step S12 writes control program to operate in the main microprocessor 30 to the Flash-ROMa 31, and goes to the step S13.

Then, the main microprocessor 30 in the step S13 determines whether or not rewrite of the repro (rewriting) of the Flash-ROMa 31 is done, then ends if it is done, otherwise returns to the step 12.

In the step S14, the main microprocessor 30 affirms end of repro of the Flash-ROMb 41 by receiving repro (rewriting) end command of the Flash-ROMb 41 to be mentioned below, and ends.

On the other hand, the GDC microprocessor 40, in the step S21, determines whether or not the repro command (command for rewrite of the Flash-ROMb 41) is received via the external communication B. i.e., I/F 42, then goes to the step S22 if received, otherwise waits in the step.

Then, in the step S22, the GDC microprocessor 40 receives the image data to be displayed on the display device 10 via the I/F 42, and goes to writing step S23 to write it to the Flash-ROMb 41.

Then, in the step S23, the GDC microprocessor 40 determines whether or not the repro (rewriting) of the Flash-ROMa 31 is done, and then ends if it is done, otherwise returns to the step 22.

Then, in the step S24, the GDC microprocessor 40 outputs end command of the repro (rewrite) of the Flash-ROMb 41 to the main microprocessor 30, and ends.

According to the present embodiment, since the I/F 42 is connected to the GDC microprocessor 40 other than a line via which data is communicated between the GDC microprocessor and the main microprocessor 30, the image data stored in the Flash-ROMb 41 can be rewritten without via the main microprocessor 30, which can simplify rewrite program, and rewriting can be done at the same time as the Flash-ROMa 31, which can also shorten rewrite time.

Preferably, I/F 42 may be made to communicate faster than the I/F 32. This makes it possible to further shorten rewrite time of the image data.

Figure 4:
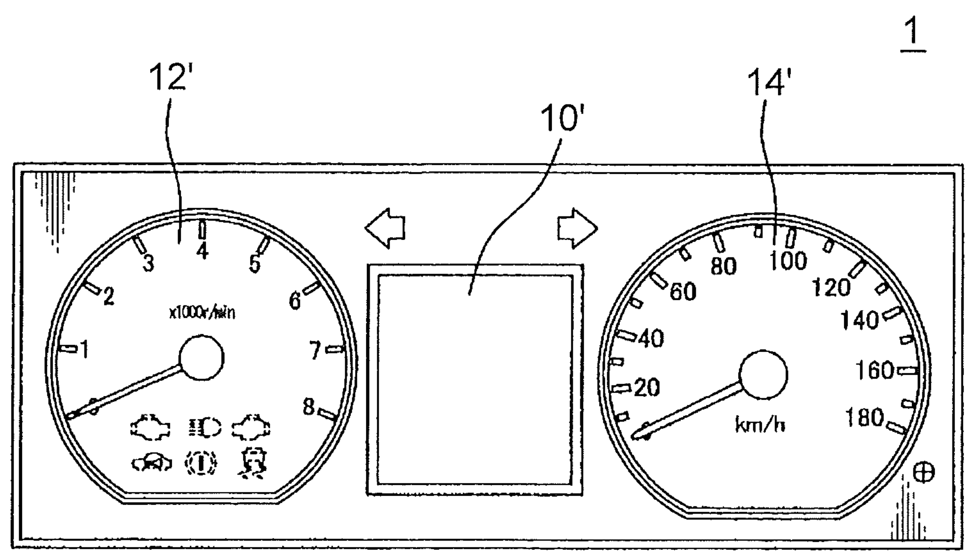
FIG. 4 is a front view depicting another vehicle instrument structure.

Note that the image data is not limited to the meter design as the embodiment mentioned above, but may include image data such as various warnings or odd/trip meter displayed on a display 10' as shown in FIG. 4 between a speed meter 14' and a tachometer 12' that are analog indicators.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

REFERENCE SIGNS LIST

1 vehicle meter (image display device)
10 display device (display means)
30 main microprocessor
31 Flash-ROMa (first memory)
32 I/F (first interface)
40 GDC microprocessor
41 Flash-ROMb (second memory)
42 I/F (second interface)

The invention claimed is:

1. An image display device comprising:

a display device displaying an image data including a first set of data and a second set of data;

a main microprocessor including a first interface configured to receive a first external communication, and a first memory; and a sub microprocessor in direct communication with the display device and controlled by the main microprocessor, the sub microprocessor including a second memory for storing the image data, and a second interface configured to receive a second external communication and directly rewrite the second memory, wherein the main microprocessor is configured to rewrite the first memory directly via the first interface to update the first set of data coinstantaneously with the sub microprocessor rewriting the second memory via the second interface in response to the second external communication to directly change the second set of data of the image data displayed by the display device without input from the main processor, wherein after rewriting in response to the second external communication the second memory via the second interface, the sub microprocessor subsequently sends a rewriting end command to the main microprocessor, and wherein the main microprocessor affirms end of rewriting of the second memory by receiving the rewriting end command from the sub microprocessor.

2. The image display device according to claim 1, wherein the second interface is configured to communicate faster than the first interface.

* * * * *